A. L. LUCE.
HARROW ATTACHMENT FOR PLOWS.
APPLICATION FILED AUG. 19, 1909.

949,039.

Patented Feb. 15, 1910.

WITNESSES
INVENTOR:

UNITED STATES PATENT OFFICE.

ALLEN L. LUCE, OF MERNA, NEBRASKA.

HARROW ATTACHMENT FOR PLOWS.

949,039.

Specification of Letters Patent.   Patented Feb. 15, 1910.

Application filed August 19, 1909.  Serial No. 513,651.

*To all whom it may concern:*

Be it known that I, ALLEN L. LUCE, a citizen of the United States, and a resident of Merna, in the county of Custer and State of Nebraska, have invented certain new and useful Improvements in Harrow Attachments for Plows, of which the following is a specification.

My invention relates to improvements in harrow attachment for plows, and although it is particularly designed for use in connection with a gang plow it may be used equally as well with any other kind of a plow.

The object of the invention is to provide a harrow attachment for a plow, which, operating in connection therewith, will break up and pulverize newly-plowed ground and which is capable of being turned up out of operative position when not in use.

A further object of my invention is to provide a harrow attachment for a plow which in simple, inexpensive, and durable in construction, and easy and effective in operation.

The details of construction of my invention will be described hereinafter and illustrated in the accompanying drawings, in which—

Figure 1:
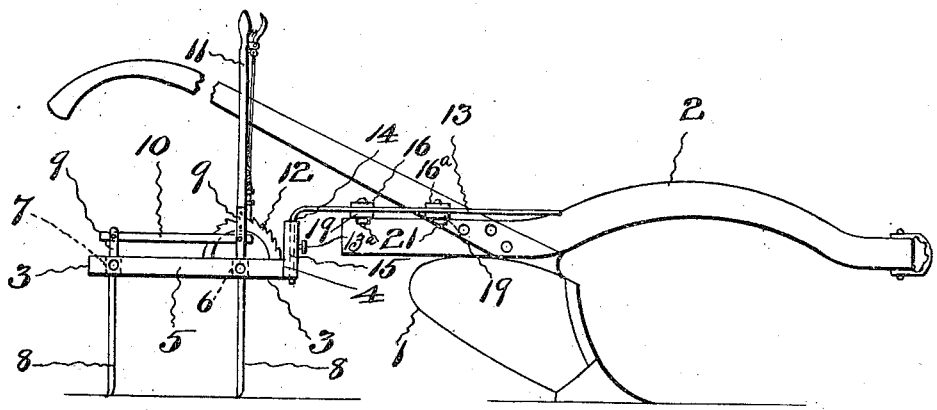
Figure 2:
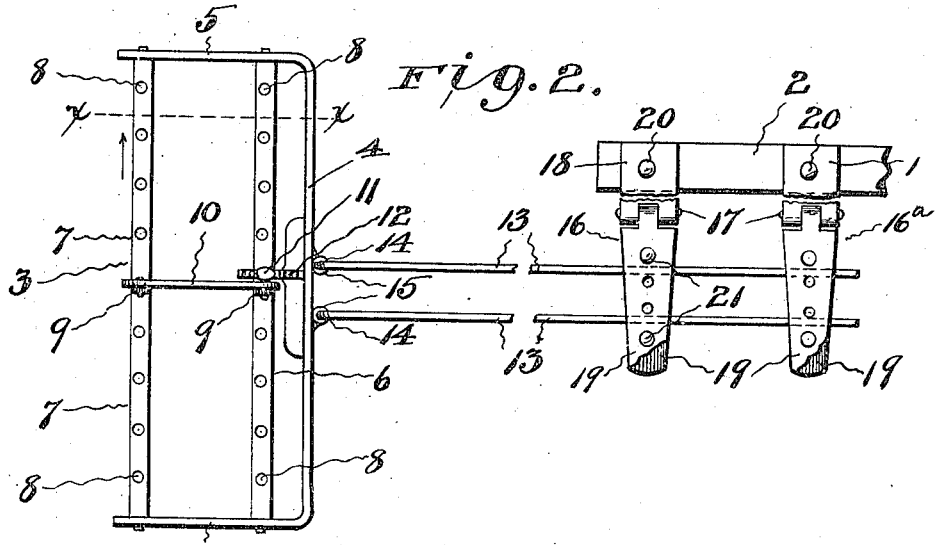
Figure 3:
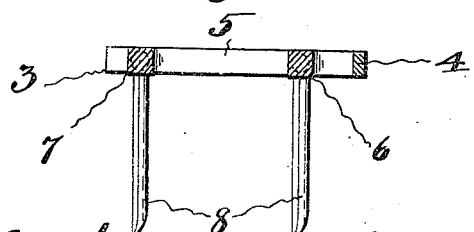

Figure 1 is a side view of my invention applied to the beam of a plow; Fig. 2, a plan view of the invention removed from the plow; and Fig. 3, a cross-section on the line *x x* of Fig. 2, on an enlarged scale.

Like reference characters indicate corresponding parts throughout the several figures of the drawings.

1 represents a plow of ordinary construction, and 2 the beam thereof.

The harrow attachment comprises a frame 3, having a front portion 4 and two sides 5, and in said sides are pivoted the ends of bars 6 and 7, said bars each being provided with a series of depending teeth 8, which are beveled to a knife edge on the front. Each of the bars 6 and 7 is provided near its middle portion with an upwardly projecting arm 9, said bars being connected together by means of a rod 10, which is pivoted at its opposite ends to the arms 9, thus insuring the simultaneous movement of the said bars 6 and 7. A lever 11 is rigidly connected to the upwardly-projecting arm 9 on the bar 6, which has a spring-pawl engaging a semi-circular rack 12, carried by the frame 3. By means of the lever 11 and the pawl and rack the bars 6 and 7, carrying the teeth may be adjusted when desired, as, for instance, when rounding a tree-stump, turning at the end of a furrow, and to accommodate the teeth to different angles with relation to the ground.

13 are two rods having their rear ends 14 bent and turned downward and inserted and held in vertical sleeves 15 on the frame 3, 13$^a$ being screws by which the downwardly-turned ends of the rods are held after they have been adjusted to the desired position in said sleeves.

16 16$^a$ are clamps hinged at 17 and comprising two parts 18 and 19, the part 18 designed to be secured to the plow-beam by means of bolts and nuts 20, and the other part 19 clamping the front ends of the rods 13 and having bolts and nuts 21. By adjusting the bolts and nuts 21 to different holes in the part 19 the front ends of the rods may be adjusted laterally.

When it is desired to turn the harrow out of operative position, it is only necessary to turn it on the hinges 17 to a vertical position.

The invention is alike applicable to walking or sulky plows.

I do not desire to be understood as limiting myself to the specific details of construction and arrangement as herein described and illustrated, as it is manifest that many variations and modifications may be made in the features of construction and arrangement and in the adaptation of the device to the various conditions of use without departing from the spirit and scope of my invention and improvements. I therefore reserve the right to all such variations and modifications as properly fall within the scope of my invention and the terms of the following claim.

Having thus described my invention, what I claim is—

In a plow, means for attaching an earth working device thereto which comprises sleeves on the earth working device, rods connecting said device to the plow-beam having their rear ends mounted in said sleeves, means for securing said rods in said sleeves at different heights, a clamp comprising two parts hinged together, one part secured to the plow-beam and the other part receiving and clamping the front ends of said rods, and means for adjusting the front ends of said rods laterally in said clamp, substantially as shown and described.

In witness whereof, I have hereunto set my hand in presence of two subscribing witnesses.

ALLEN L. LUCE.

Witnesses:
F. L. BEALS,
J. T. DAVIS.